US012269076B1

(12) United States Patent
Boos et al.

(10) Patent No.: US 12,269,076 B1
(45) Date of Patent: Apr. 8, 2025

(54) SYSTEM AND METHOD FOR EFFICIENT REMOVAL OF RESIDUAL CONCRETE FROM READY MIXED CONCRETE DRUMS

(71) Applicant: Ready-Jet Solutions, Inc., Tampa, FL (US)

(72) Inventors: Scott F. Boos, Tampa, FL (US); Justin Valdes, Tampa, FL (US)

(73) Assignee: Ready-Jet Solutions, Inc., Tampa, FL (US)

( * ) Notice: Subject to any disclaimer, the term of this patent is extended or adjusted under 35 U.S.C. 154(b) by 0 days.

(21) Appl. No.: 18/920,448

(22) Filed: Oct. 18, 2024

(51) Int. Cl.
*B08B 9/08* (2006.01)
*B05B 3/00* (2006.01)

(52) U.S. Cl.
CPC .............. *B08B 9/0813* (2013.01); *B05B 3/00* (2013.01)

(58) Field of Classification Search
None
See application file for complete search history.

(56) References Cited

U.S. PATENT DOCUMENTS 8,301,306 B1 * 10/2012 Boos .......................... B08B 3/02 134/34
2007/0079852 A1 * 4/2007 Boos ........................ B08B 9/093 134/167 R

* cited by examiner

*Primary Examiner* — Cristi J Tate-Sims
(74) *Attorney, Agent, or Firm* — Nicholas Pfeifer; Smith & Hopen, P. A.

(57) ABSTRACT

An advanced concrete drum cleaning system that includes a dynamically controlled oscillating nozzle, a boom zeroing function, a breakaway mounting plate, and a hydraulic assembly for enhanced safety. The system features a motor-driven nozzle having a stroke length that can be dynamically adjusted in real-time using feedback from an encoder. A controller with a user interface allows operators to precisely control and monitor the nozzle's position. Additionally, the system includes a boom zeroing function, enabling the operator to set and maintain a reference position for the boom within the concrete drum. The hydraulic assembly, consisting of lifting and lowering components, allows the nozzle housing to quickly disengage from obstructions to prevent damage. Moreover, the breakaway mounting plate provides a means for limiting damage when the nozzle housing is unable to disengage from obstructions.

18 Claims, 13 Drawing Sheets

SYSTEM AND METHOD FOR EFFICIENT REMOVAL OF RESIDUAL CONCRETE FROM READY MIXED CONCRETE DRUMS

BACKGROUND OF THE INVENTION

Field of the Invention

This invention relates, generally, to systems and methods for removing concrete from the inside of ready mixed concrete truck drums. More particularly, it relates to systems and methods that do not require a worker to enter into the drum, thereby protecting the worker from various occupational hazards.

Brief Description of the Prior Art

Ready mixed concrete drums are rotatably mounted on concrete trucks so that the concrete in the drum can be continuously mixed as it is transported from a concrete batching facility to a job site. Upstanding helical fins or blades are mounted on the interior walls of the rotating drum so that concrete at the closed end of the drum is driven to the open end of the drum when the drum is rotated in a discharge direction. The helical fins or blades act as an auger, urging the concrete towards the discharge end of the drum when the drum is in said discharge mode. The helical fins or blades urge the concrete in the other direction when the drum is rotating in a mixing direction.

It is inevitable that some concrete will remain within the drum after each load of concrete has been discharged. Over time, the drum is laden with residual hardened concrete that gradually builds up, substantially increasing the weight of the truck when "empty" and substantially reducing the volume of concrete that the truck can legally haul. The residual concrete also adversely affects the quality of the ready mixed concrete carried by the truck. Some companies combat this problem by attempting to clean the drum at the end of each workday, before the build-up becomes severe. Others just wait until the problem becomes acute.

In the early 2000s, the Applicant of the present invention secured patent rights to a device for cleaning a ready mixed concrete drum as described in U.S. Pat. No. 7,546,843. Over the years several pitfalls were discovered.

One pitfall of the previous version is the nozzle location. The nozzle is set back away from the distal end of the torpedo to allow the nozzle to effectively clean the back side of the fins in the drum. While the nozzle location serves that purpose, it also reduces the water pressure at the distal tip of the torpedo-shaped nozzle housing in comparison to the pressure that would be possible if the nozzle were closer to the distal end of the torpedo-shaped nozzle housing. It turns out that the head of the concrete drum often has the most concrete buildup (often referred to as the "head pack"). The head pack can be several feet thick at times and thus it takes more time to cut through the head pack than to remove the buildup on the fins. In some instances, the head pack is so thick that the offset nozzle of the previous design is unable to cut completely through the concrete.

Another pitfall is that the nozzle on the previous device has a predetermined, non-adjustable stroke length during use. The design includes a rigid link connected to a cam, which causes the nozzle to reciprocate much like a windshield wiper. The degree of rotation or "sweep" (also referred to as "stroke length") can be adjusted by securing a first end of the rigid link to a different location on the cam. However, the stroke length is not adjustable on the fly while the device is in use. The lack of adjustability prevents the user from adjusting the stroke length as the blades change based on the location within the drum. The fixed oscillation results in the water jet directed towards open air at various locations, which is a significant waste of time, water, fuel, and energy.

The previous device also lacks the ability to convey to a user where the nozzle is located within the drum. The drums have bulging middle sections and different size fins spaced about their longitudinal axes. To efficiently clean the drum, the location of the nozzle housing must be known so that a user can adjust the angle of the nozzle housing relative to the longitudinal axis of the boom. However, the previous device lacks the features necessary to precisely convey to an operator the location of the nozzle housing relative to the drum requiring operators to guess where the nozzle housing is located within the dark and steamy drum.

The previous invention is also susceptible to a potentially dangerous and catastrophic situation in which the nozzle housing catches on the rotating fins and/or attaches to debris in the drum and the continued rotation of the drum causes breakage of the boom or nozzle housing.

Accordingly, there is a need for an improved system and method for removing concrete from the inside of ready mixed concrete truck drums. However, in view of the prior art taken as a whole at the time the present invention was made, it was not obvious to those of ordinary skill how the identified needs could be fulfilled.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an improved system and method for removing concrete from the inside of ready mixed concrete truck drums is now met by a new, useful, and nonobvious invention.

The present invention includes an apparatus for removing residual concrete from an interior of a rotatably mounted ready mixed concrete truck drum. The apparatus includes an elongated boom configured to be inserted into the drum generally along a longitudinal axis of the drum; a nozzle housing hingedly connected to a leading end of the boom so that the nozzle housing is positionable in a plurality of angular positions relative to the boom; a high-pressure nozzle rotatably mounted within the nozzle housing; a motor configured to oscillate the nozzle about a stroke length; an encoder configured to monitor the position of the nozzle along the stroke length; a controller in operable communication with the motor and the encoder; and a source of high-pressure water fluidically coupled to the nozzle.

In some embodiments, the controller is configured to dynamically alter the stroke length and stop rotation of the nozzle based on real-time feedback from the encoder. The controller or the system may also include a user interface that displays the position of the nozzle about the stroke length. The controller may further include actuators that allow the operator to alter the stroke length, oscillation speed, and fix the nozzle at a specific location along its stroke length. In some embodiments, the controller is configured to limit the stroke length to any reduced range within the full stroke length.

The system may further include a boom translation sensor in operable communication with the controller. The controller is configured to allow an operator to set a current position of the boom as a reference position by activating a boom zeroing actuator on the controller and the boom translation sensor is configured to track a change in position of the boom relative to the reference position and convey the change in position of the boom to the operator.

Some embodiments of the present invention include a hydraulic system configured to pivot the nozzle housing relative to a longitudinal axis of the boom. The hydraulic system has a lifting hydraulic assembly, a lowering hydraulic assembly, and a power down hydraulic assembly. The hydraulic system is configured to charge the lowering hydraulic assembly while the lifting hydraulic assembly is in use, enabling the lowering hydraulic assembly to quickly drop the nozzle housing. In addition, the power down hydraulic assembly is configured to direct hydraulic fluid at greater pressure in comparison to the lowering hydraulic assembly to more rapidly drop the nozzle housing. The controller is in operable communication with the hydraulic system to manage the hydraulic pressure and control the pivoting of the nozzle housing.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
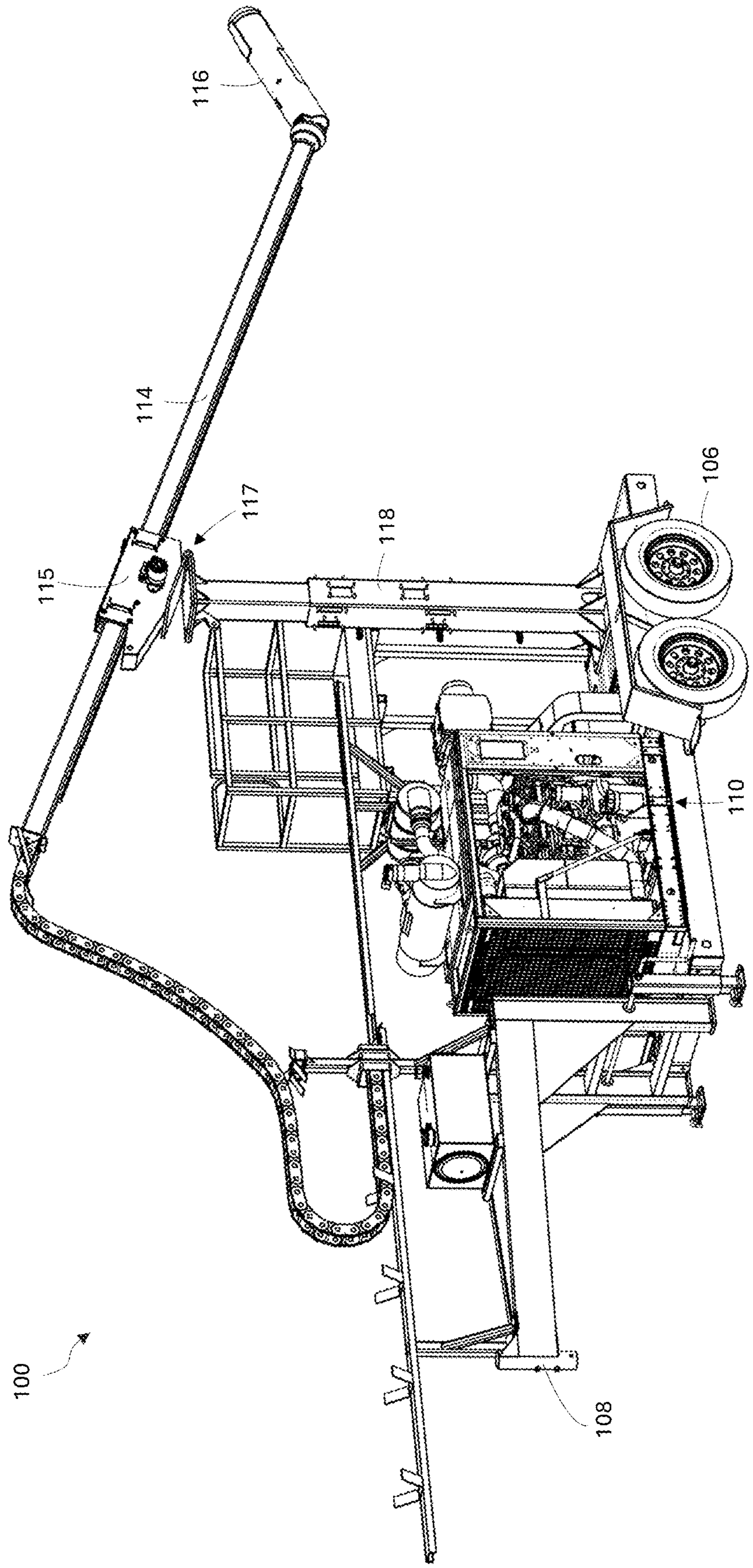
FIG. 1 is a perspective view of an embodiment of the present invention with the boom in an extended orientation.

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

All numerical designations, such as measurements, efficacies, physical characteristics, forces, and other designations, including ranges, are approximations which are varied up or down by increments of 1.0 or 0.1, as appropriate. It is to be understood, even if it is not always explicitly stated that all numerical designations are preceded by the term "about." As used herein, "about" or "approximately" refers to being within an acceptable error range for the particular value as determined by one of ordinary skill in the art, which will depend in part on how the value is measured or determined. As used herein, the term "about" refers to ±10% of the numerical; it should be understood that a numerical including an associated range with a lower boundary of greater than zero must be a non-zero numerical, and the term "about" should be understood to include only non-zero values in such scenarios.

Some aspects of the invention can be embodied as special-purpose hardware (e.g. circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compacts disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation. In addition, such phrases do not necessarily refer to the same embodiments or different embodiments.

The present invention is an enhancement to the existing concrete drum cleaning systems, such as the system detailed in U.S. Pat. No. 7,546,843. The present invention provides significant improvements in nozzle location and control, boom positioning, nozzle housing positioning, and safety mechanisms to address the pitfalls identified in the prior art.

Figure 2:
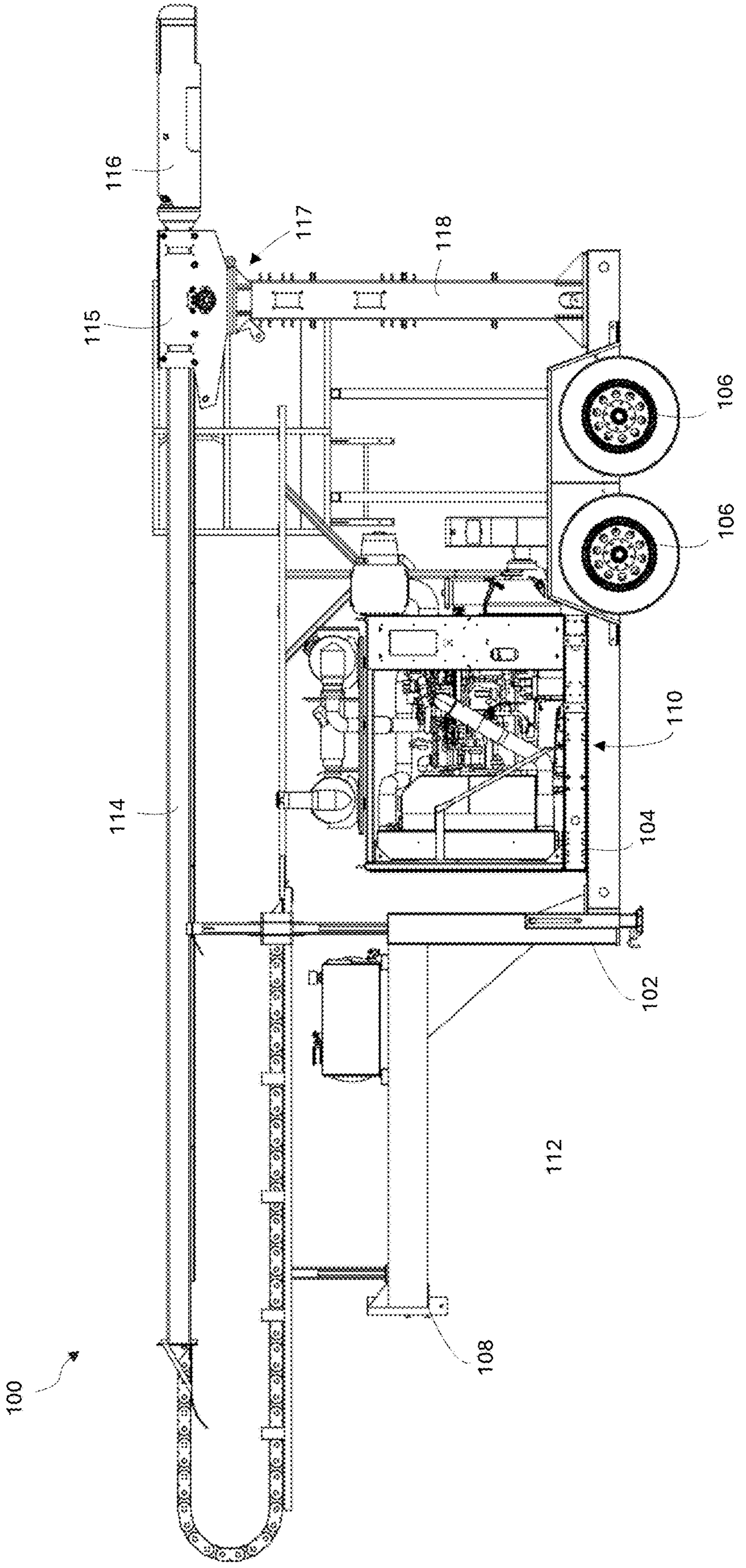
FIG. 2 is a side view of an embodiment of the present invention with the boom in a retracted orientation.
Figure 3:
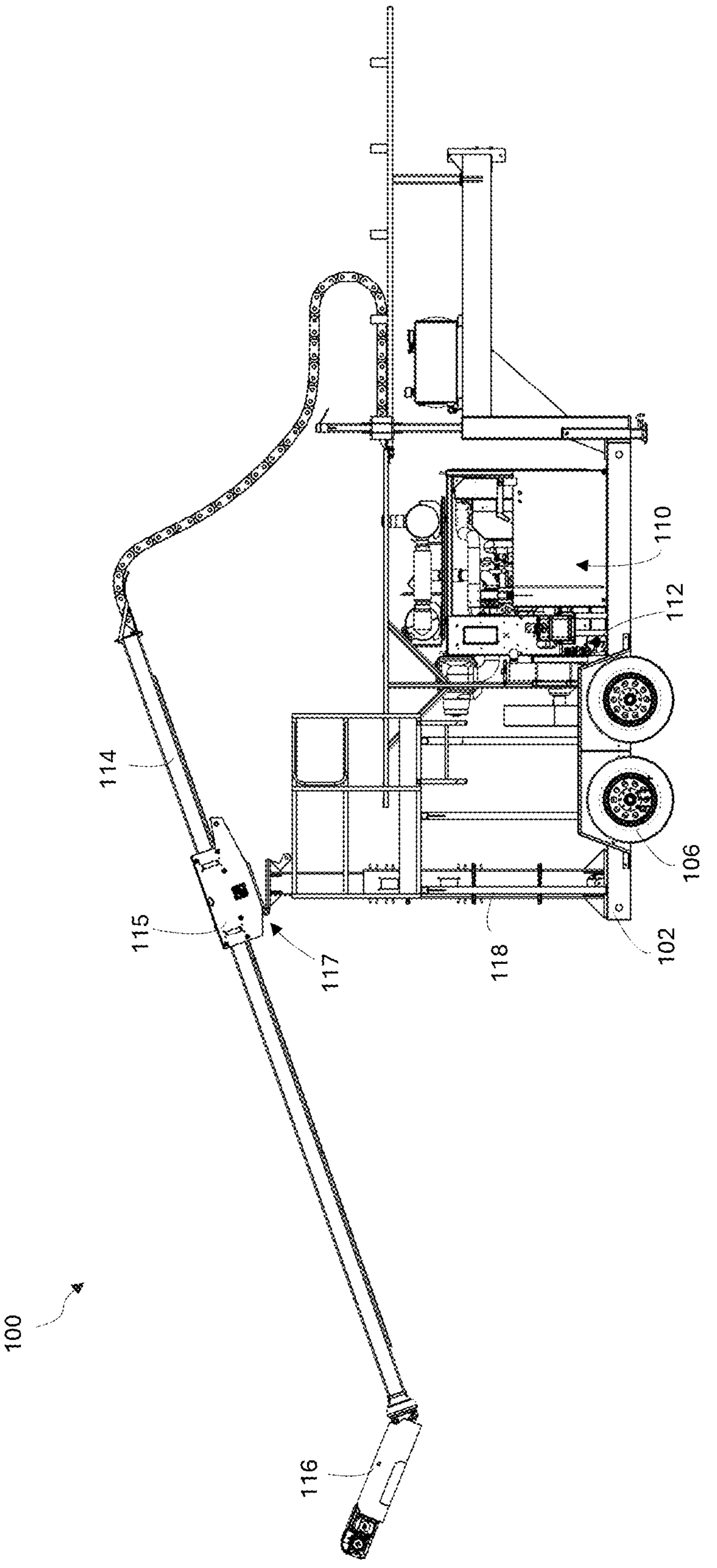
FIG. 3 is a side view of an embodiment of the present invention with the boom in an extended orientation.

Referring now to FIGS. 1-3, it will there be seen that an illustrative embodiment of the invention is denoted as a whole by the reference number 100. Like the prior art, embodiments of the present invention includes trailer 102 having trailer bed 104, wheels 106, hitch assembly 108, engine 110, and engine-powered water booster pump 112. The present invention further includes boom 114 to which nozzle housing 116 is attached.

Boom 114 passes through boom housing 115, which is mounted atop hydraulic motor mount assembly 117 and hydraulic motor mount assembly 117 is disposed in surmounting relation to tower 118. Tower 118 is configured to telescopically adjust the height of boom housing 115 relative to trailer bed 104. The telescopic movement can be controlled by an internal hydraulic cylinder or any other known mechanism configured to achieve the desired functionality.

As shown in FIG. 3, boom housing 115 is hingedly secured to tower 118 and hydraulic motor mount assembly 117 is in operable communication with boom housing 115 to pivot boom housing 115 about a hinge. Boom housing 115 is further configured to ensleeve elongate nozzle boom 114. Some embodiments include an inclinometer or another sensor known in the art to detect and convey to an operator the insertion angle/hinge angle of boom 114 so that an operator can determine and set the angle of the elongate boom for better cleaning capability.

Boom 114 is mounted atop an elongate rack gear and is secured thereto for conjoint displacement therewith. A pinion gear disposed within boom housing 115 meshingly engages the elongate rack gear on an underside thereof. The pinion gear is secured to an output shaft of a reversible hydraulic motor so that rotation of the output shaft in a first direction causes retraction (leading-to-trailing displacement) of boom 114 and rotation of said output shaft in a second direction opposite to said first direction causes extension (trailing-to-leading displacement) of boom 114.

Figure 4:
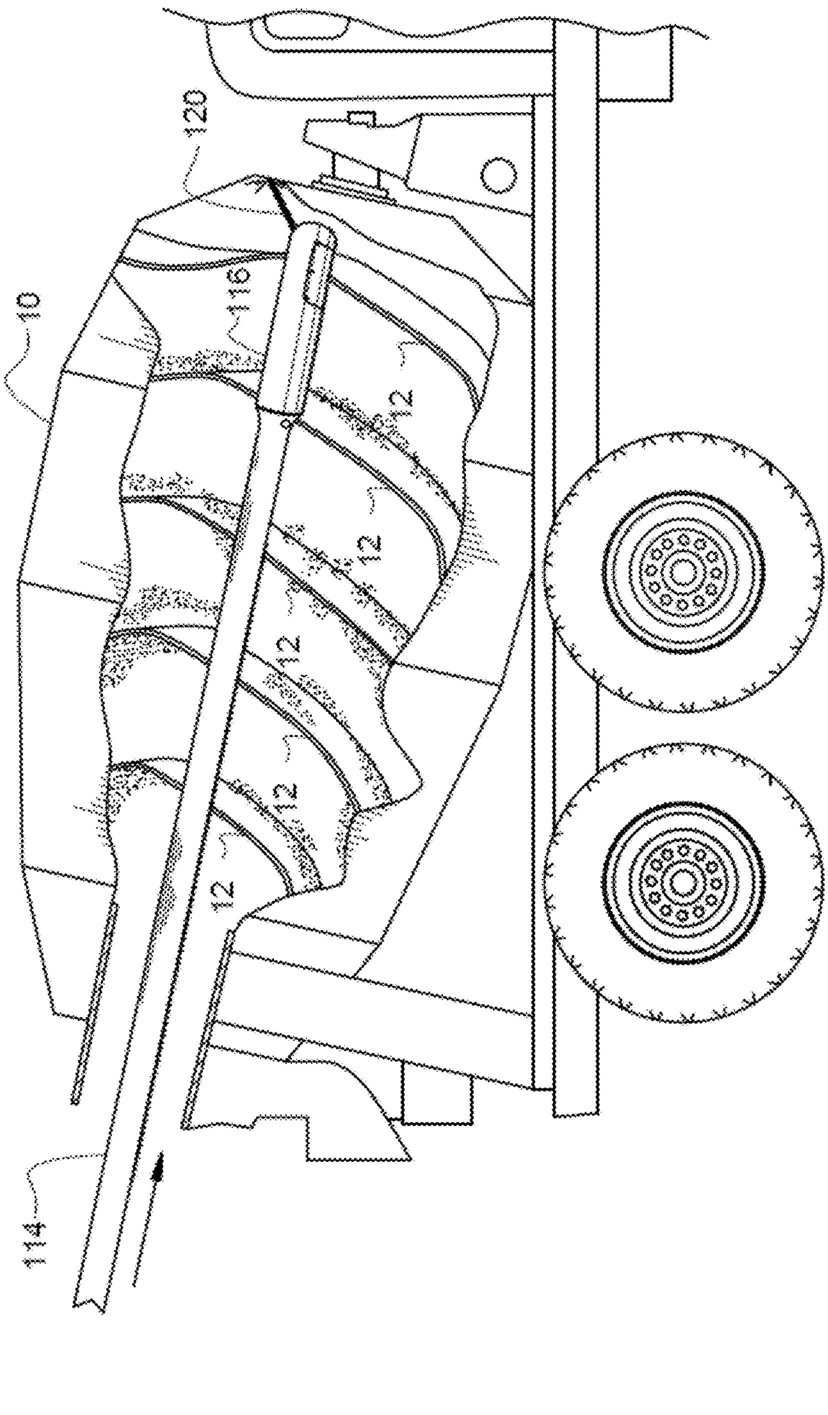
FIG. 4 is a sectional view depicting an embodiment of the boom disposed within the drum of a ready-mix concrete truck.
Figure 5:
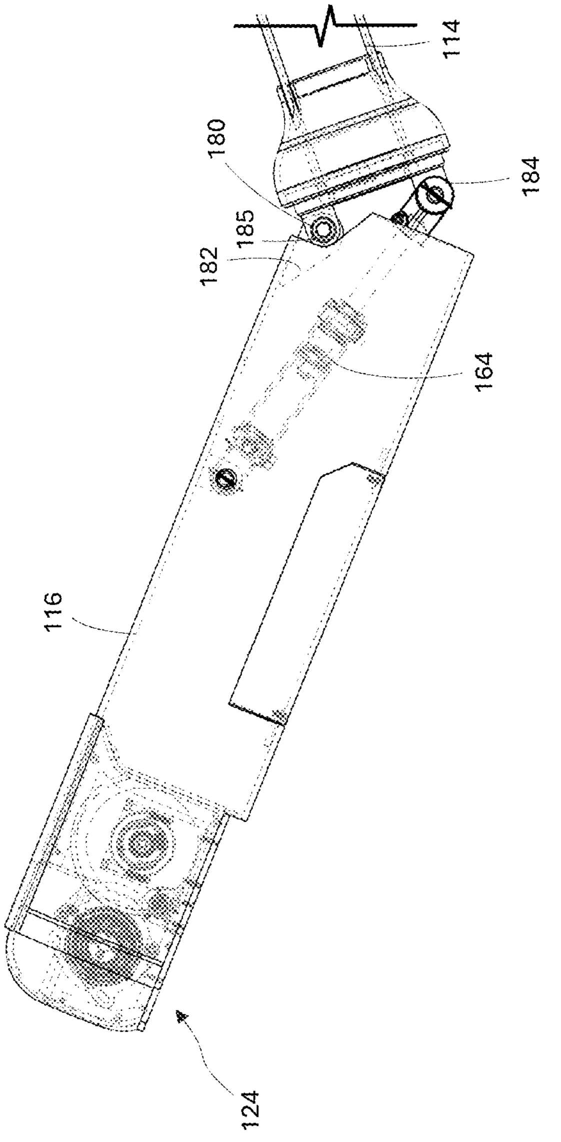
FIG. 5 is a close-up view of an embodiment of the nozzle housing.
Figure 6:
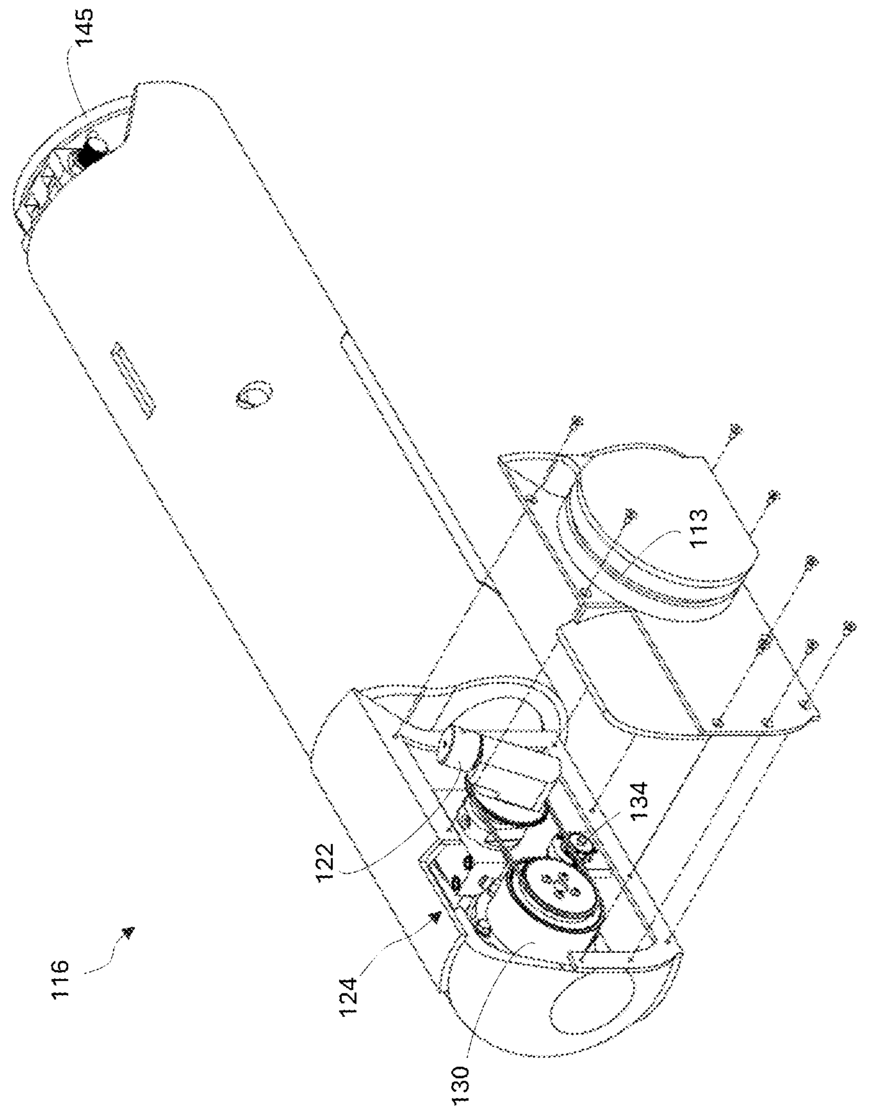
FIG. 6 is a partial exploded view of an embodiment of the nozzle housing.
Figure 7:
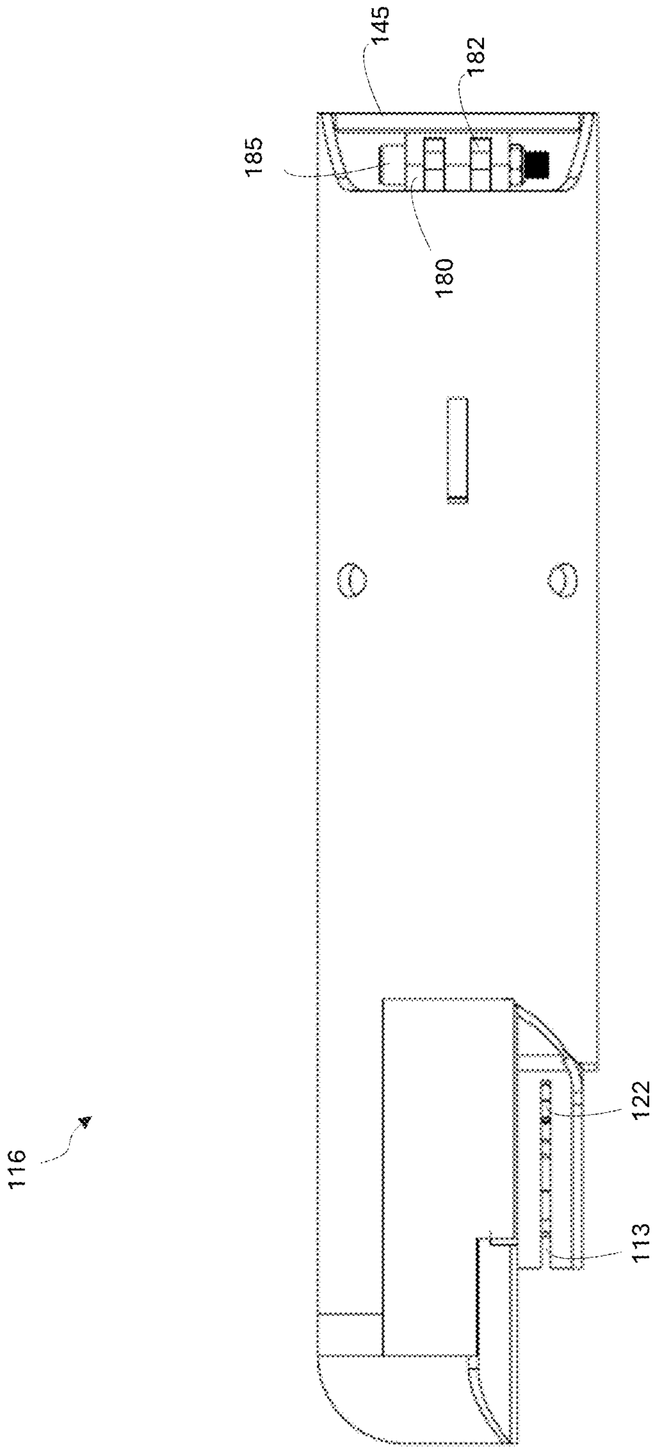
FIG. 7 is a top view of an embodiment of the nozzle housing.
Figure 8:
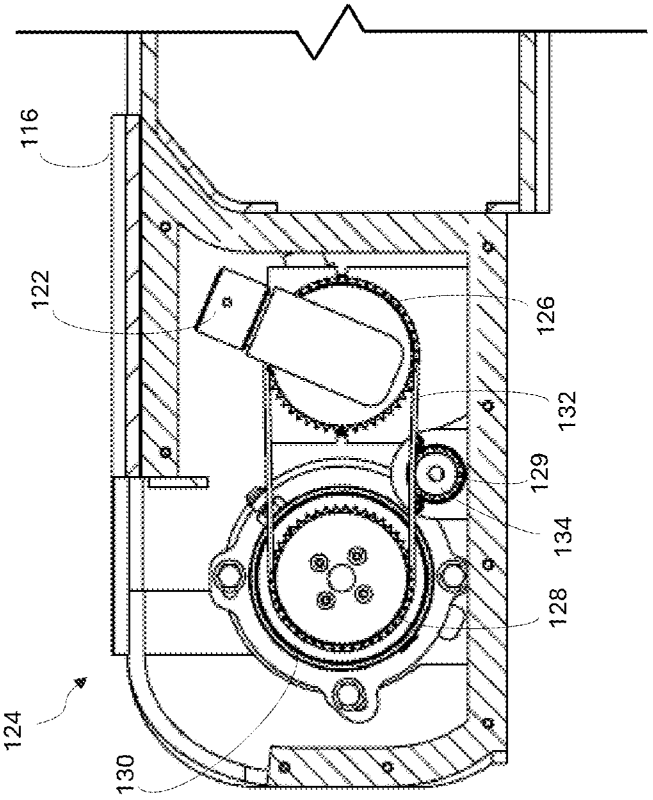
FIG. 8 is a sectional view of an embodiment of the nozzle housing.

Boom 114 is depicted in a fully retracted configuration in FIGS. 1-2 and in a partial extended configuration in FIG. 3. Boom 114 is generally retracted prior to insertion into the hollow interior of a ready mixed concrete drum 10 through the opening in the drum. Boom 114 can then be extended to enter the drum 10 as shown in FIG. 4 to clean fins 12 and the head pack through high-pressure water jet 120.

The system also includes a boom location sensor configured to determine the location and amount of translation of boom 114. The boom location sensor may be located in boom housing 115 or another location sufficient to determine the amount of translation of boom 114 relative to a particular location about the system. In some embodiments, the boom location sensor is an encoder in operable engagement with the gearing that enables translation of boom 114. However, alternative sensors can be used, including but not limited to linear positioning sensors, laser sensors, inertial measurement units, and hall effect sensors.

Referring back to FIGS. 1-2, torpedo-shaped nozzle housing 116 is hingedly secured to the leading end of boom 114 via mount 145 and nozzle housing 116 is in axial alignment with boom 114 when in its position of repose. Nozzle housing 116 includes nozzle 122, which is in fluidic communication with pump 112. Pump 112 delivers water under high pressure (e.g., greater than or equal to approximately 15,000 PSI) to nozzle 122 within nozzle housing 116 via an elongated hose and/or pipe (not depicted).

Nozzle 122 features a custom nozzle head, such as, a ceramic or sapphire nozzle, encased in a stainless-steel housing. The sapphire nozzle design delivers 25% more energy on the surface, resulting in a more efficient jet with superior laminar flow of water compared to prior art designs. The enhanced laminar flow significantly increases the nozzle's performance. This improvement allows nozzle 122 to remove hardened concrete more effectively and efficiently. The increased efficiency of the jet translates to substantial savings in time, labor, water, fuel, and wear on parts, making the cleaning process not only faster but also more cost-effective and sustainable.

Nozzle housing 116 also includes discharge slot 113 disposed proximate the leading end of nozzle housing 116. Discharge slot 113 has length and shape sufficient to align with the discharge aperture of nozzle 122 at any location about the oscillation of nozzle 122. When pump 112 is operated, nozzle 122 discharges high-pressure water through discharge slot 113 as exemplified by water stream 120 in FIG. 4.

In some embodiments, nozzle 122 has a stroke length and discharge slot 113 has an arc length that extend predetermined distances below and above the longitudinal axis of nozzle housing 116. In some embodiments, the arc lengths of the stroke length and discharge slot 113 are approximately 35-55 degrees below the longitudinal axis of nozzle housing 116 and approximately 133-113 degrees above the longitudinal axis of nozzle housing 116. In some embodiments, the arc lengths are approximately 45 degrees below the longitudinal axis of nozzle housing 116 and approximately 123 degrees above the longitudinal axis of nozzle housing 116. In total the arc lengths are approximately 168 degrees.

As noted in the background section, the prior art device included a nozzle offset roughly eight inches from the distal end of the nozzle housing. The eight-inch nozzle offset ensured that the high-water pressure could be directed to the entire rear surface of the fins in the concrete drum. However, the offset also increased cleaning time required to blast away hardened concrete from the fins and the head pack, and in some instances prevented the high-pressure water from fully penetrating the head pack. To cure this deficiency, embodiments of the present invention include a nozzle having a reduced offset (e.g., less than one inch) from the outer surface of the nozzle housing. The reduction in the standoff distance of the nozzle greatly improved the performance of the machine and reduced cleaning times, water usage, fuel consumption, part deterioration, and labor costs.

The prior art device also had a limited degree of oscillation while maintaining the nozzle within the nozzle housing to protect falling concrete. The limited oscillation is a result of the nozzle oscillator assembly (the rigid link and cam assembly). In addition, the nozzle oscillator assembly of the prior art device is also inefficient in that the stroke length is set based on the location at which the rigid link is secured to the cam and could only be modified if the device ceased operation and an operator disassembled the housing to alter the attachment of the link to the cam. In other words, the prior art nozzle oscillator assembly is incapable of on-the-fly adjustments to the stroke length of the nozzle or cessation of the oscillation for fixed blasting. The prior art device is also incapable of conveying to an operator the location of the nozzle about its stroke length.

The improved system of the present invention features an improved nozzle oscillator assembly that allows for the necessary stroke length for the more forward positioned nozzle of the present invention. The improved nozzle oscillator assembly also allows for greater control of the nozzle oscillation and embodiments of the present invention include a controller with a nozzle indicator designed to display the exact position of the nozzle along its stroke length in real-time. This indicator is integrated with a user interface, enabling the operator to monitor the nozzle's position accurately within the drum. The system includes a controller that allows the adjustment of the nozzle's stroke length on the fly. This controller can limit the stroke length to any reduced range within the full stroke length, including fixing the location of the nozzle about its stroke length, enabling precise control and minimizing water wastage.

Referring to FIGS. 5-9, nozzle oscillator assembly 124 is disposed in the leading end of nozzle housing 116. Nozzle oscillator assembly 124 includes nozzle 122, motor 130, encoder 134, and torque transmission components.

Figure 9:
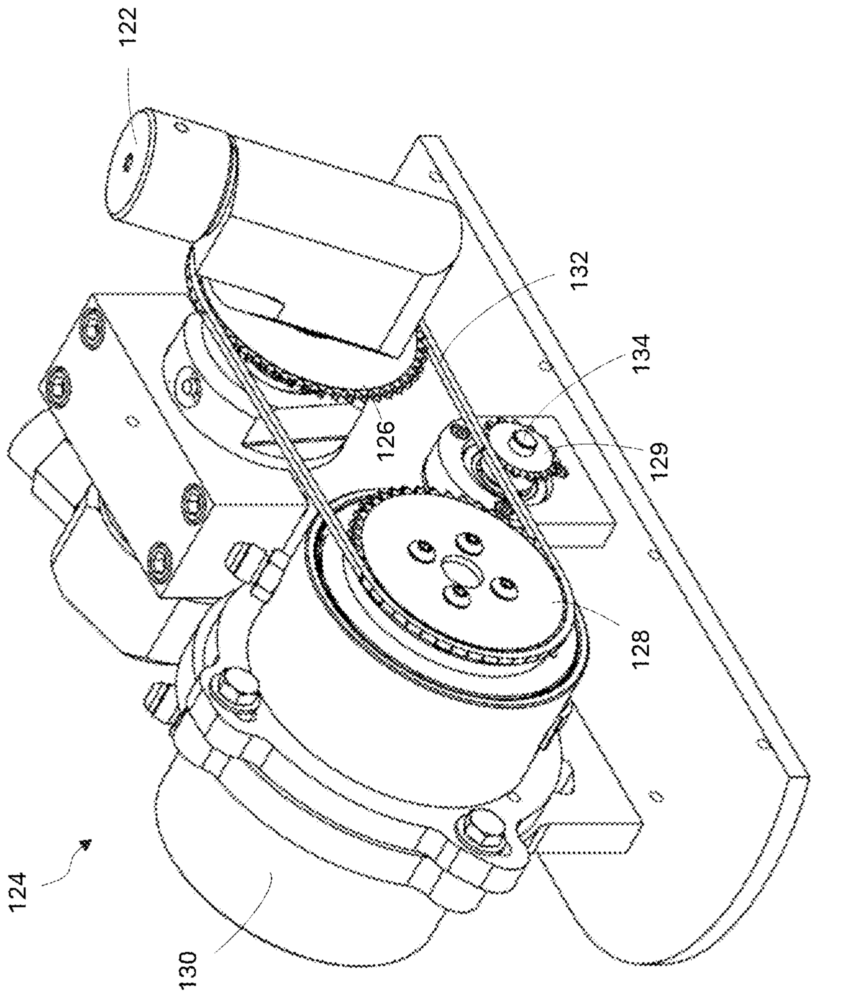
FIG. 9 is a perspective view of an embodiment of the nozzle assembly.

As best depicted in FIG. 9, nozzle 122 is secured to spur gear 126 in a non-rotational manner, such that nozzle 122 rotates in union with spur gear 126. Spur gear 126 is in operable communication with spur gear 128, which is secured to motor 130 such that rotation of the motor shaft (not depicted) causes rotation of spur gear 128. Rotation of the motor shaft and spur gear 128 drives belt 132, which in turn rotates spur gear 126 and nozzle 122. Encoder 134 is also in operable communication with drive belt 132 through spur gear 129 allowing encoder 134 to determine the degree of rotation of nozzle 122 and/or motor 130. However, alternative connections and components are considered for torque transmission between motor 130 and nozzle 122.

Motor 130 is configured to rotate in both a clockwise and a counterclockwise direction to effect oscillation of nozzle 122 about a nozzle stroke length. In some embodiments, motor 130 is configured to rotate between clockwise and counterclockwise limit points. Those limit points are sufficient to execute the stroke length disclosed in previous paragraphs. This motor functionality and resulting stroke length ensures that nozzle 122 can hit the entire front and back surfaces of any fin design in the industry.

The present invention further includes controller 136. As non-limiting examples, controller 136 is configured to control the rotation of motor 130, the pivot of the nozzle housing 116 relative to boom 124, the translation of boom 124, the slope/rotation of the pivot of boom housing 115 about its hinge, the height of tower 118, the operation of engine 110, and/or the operation of water booster pump 112. Controller 136 and its supporting circuitry is in operable communication (wired or wireless communication) with said components and any supporting circuitry of said components to enable control of said components.

Controller 136 may be a portable handheld unit or may be attached to the observation tower or some other structure of the device. Some embodiments include both an integrated/attached controller and a handheld controller, i.e., a dual control system. In these embodiments, each controller is capable of independently operating the device, providing full control functionality. The controllers are synchronized through a communication link, ensuring that inputs and commands are consistently shared between them. This setup allows operators to use either controller to manage the device, enhancing operational flexibility and providing a backup in case one controller fails. Conflict resolution mechanisms are in place to ensure coherent control, prioritizing commands as necessary to maintain smooth operation.

Regardless of the number of controllers, controller(s) 136, in conjunction with nozzle oscillator assembly 124, enables an operator to precisely control the oscillatory motion of nozzle 122, alter the stroke length as desired, and/or fix nozzle 122 at a specific location along its stroke length. More specifically, controller 136 sends signals to the motor driver circuitry to initiate the oscillatory motion of motor 130, causing nozzle 122 to rotate back and forth about its stroke length. Encoder 134, through its operable engagement with belt 132 via gear 129 (or an alternative engagement with motor 130, spur gear 126, spur gear 128, and/or nozzle 122), continuously monitors the rotation of motor 130, providing real-time feedback to controller 136. It should be noted that encoder 134 can be any encoder/sensor known in the art for tracking rotation.

Figure 10:
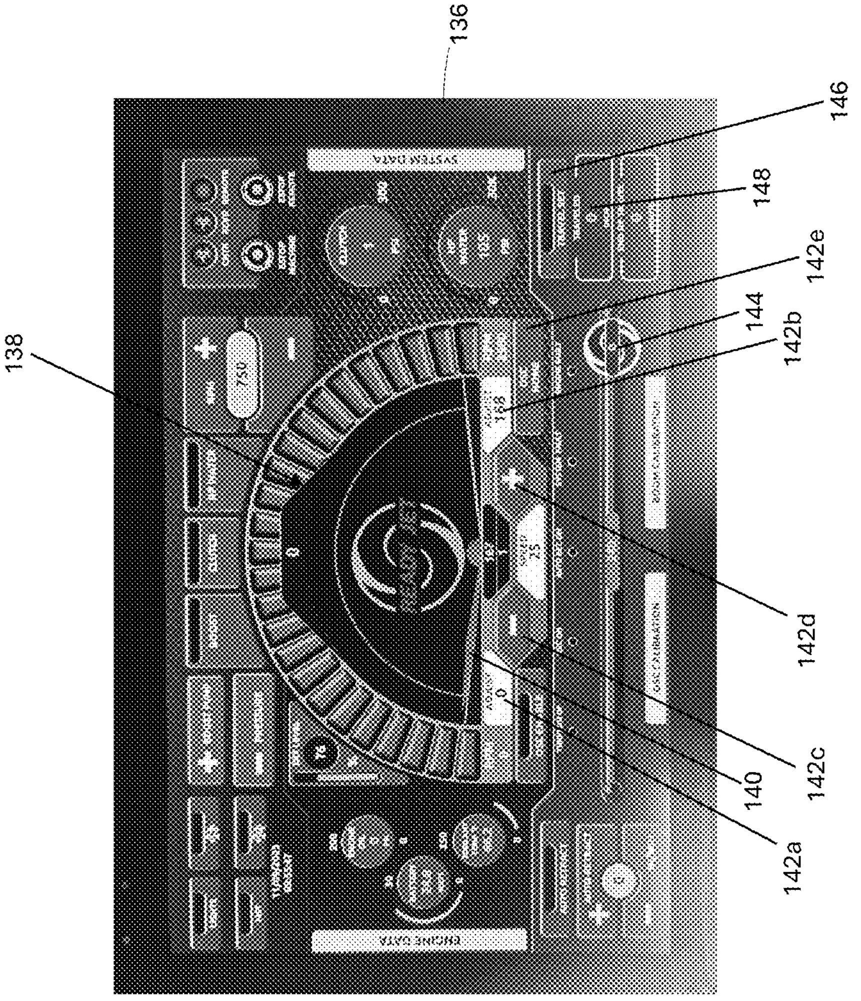
FIG. 10 depicts an embodiment of a user interface for an embodiment of the controller.
Figure 11:
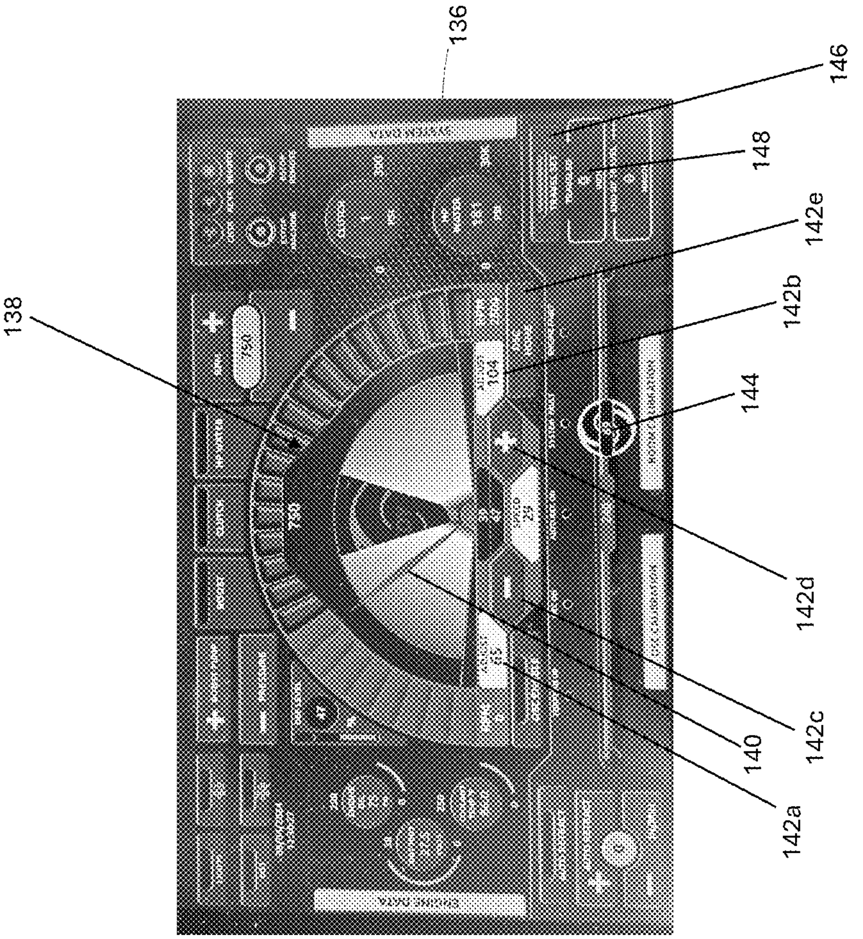
FIG. 11 depicts an embodiment of a user interface for an embodiment of the controller.

Controller 136 includes a user interface enabling the operator to view and adjust the stroke length dynamically. As illustrated in FIGS. 10-11, some embodiments of controller 136 include oscillation display 138 which is configured to actively depict the location of nozzle 122 about its oscillation through indicator 140 and also depict the stop limits for the oscillation. Controller 136 also includes actuators which provide the operator with the ability to alter the stroke length through forward stop actuator **142*a* and rear stop actuator 142*b*, oscillation speed through speed increasing actuator 142*c* and speed decreasing actuator 142*d*, and/or fix the nozzle at a location about its stroke through actuator 142*e* labeled "OSC HOME." Actuators 142 may be in any form known in the art for providing an interface with an operator including but not limited to buttons, touchscreen interfaces, joysticks, switches, touch sensors, trackballs, dials, etc. In addition, while the depicted controller 136 is shown as a digital touch screen, it should be understood that the one or more controllers 136** can be in alternative forms including a handheld unit with physical actuators, including but not limited to buttons, dials, and joysticks.

By inputting the desired stroke length, controller 136 processes the inputs and modifies the oscillation parameters of motor 130, allowing nozzle 122 to operate within the specified stroke length. This feature enables precise control over the rotation of nozzle 122, ensuring optimal cleaning efficiency by adapting to varying conditions within the drum.

When the operator needs to stop the oscillation and fix nozzle 122 at a desired position, the operator can send a command via controller 136. For example, the operator can select actuator **142*e*, which will send nozzle 122 to a "home" position (which is adjustable to an operator's preference), where it will remain fixed. Upon receiving this command, controller 136 processes it, calculates the required position based on the feedback from encoder 134, and sends a signal to the motor driver circuitry to stop rotation of motor 130 at the desired position. The motor driver circuitry then decelerates motor 130 to a halt, with encoder 134** providing position feedback to ensure precise stopping.

Controller 136 may then engage a locking mechanism or apply a holding current to motor 130 to maintain the position of nozzle 122, preventing any unintended movement. The system verifies the fixed position of nozzle 122 using feedback from encoder 134, and the operator can confirm this via indicator 140 on oscillation display 138, which displays the position nozzle 122. This integrated approach ensures accurate and reliable positioning, enhances the efficiency and effectiveness of the nozzle's operation, and provides flexibility in adjusting the stroke length to suit specific cleaning requirements based on the location of nozzle 122 relative to the drum and the design of the specific drum.

Controller 136 may also include a graphical and/or numerical boom position indicator 144 to convey to the operator the location of boom 114 based on the boom translation sensor. In addition, controller 136 includes a boom zeroing actuator 146 labeled "TRAVEL SET." Like actuators 142, boom zeroing actuator 146 may be in any form known in the art for providing an interface with an operator including but not limited to a button, touchscreen interface, joystick, switch, touch sensor, trackball, dial, etc. Boom zeroing actuator 146 allows the operator to set a position of boom 114 as the zero position, which is exemplified in FIG. 11. As depicted, boom 114 has been partially extended, but boom zeroing actuator 146 has been actuated causing the boom "traveled" display 148 to indicate that boom 114 is at a zero point/location.

When the operator positions boom 114 at the desired reference location within the concrete drum, the operator can actuate boom zeroing actuator 146 on controller 136. This action triggers controller 136 to record the current position of boom 114 relative to boom housing 115 or another reference point. Once set, this zero position serves as a reference point for subsequent translation of boom 114. If for example, an operator identifies the entrance or the opposing wall of the drum as a zero point, then an operator can more readily distinguish the location of boom 114 within the drum.

Figure 12:
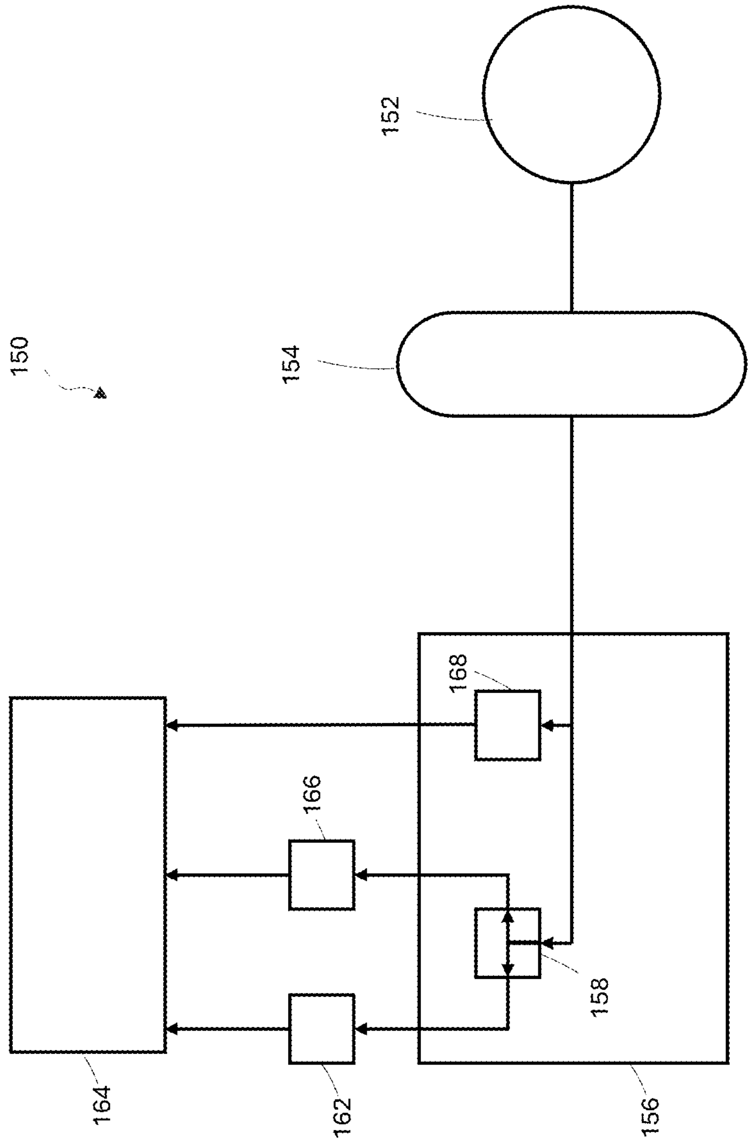
FIG. 12 is a block diagram representing an embodiment of the hydraulic system in accordance with an embodiment of the present.

Referring now to FIG. 12, the present invention includes a hydraulic system 150 configured to raise and lower nozzle housing 116 and also "power down" nozzle housing 116 out of contact with fins 12 and/or hardened concrete when significant resistance is encountered. This "power down" action refers to the rapid movement of nozzle housing 116 downward through greater hydraulic force than is typically used to lower nozzle housing 116.

Similar to the prior art device, nozzle housing 116 is hydraulically pivoted upwards to bring the leading end of nozzle housing 116 into close proximity of fins 12. The hydraulic nozzle positioning pressure is carefully tuned, considering the thrust of the water jet and the weight of nozzle housing 116, allowing it to "float" around fins 12 during the cleaning process. In the prior art device, the nozzle housing would sometimes snag on hardened concrete or fins 12, leading to situations where the nozzle housing and/or boom was forced beyond its elastic deformation limits, resulting in a destructive event.

To address this issue, hydraulic system 150 of the present invention employs both a lifting and lowering hydraulic assembly along with a power down hydraulic assembly. The lifting hydraulic assembly is responsible for pivoting the nozzle housing 116 upwards, bringing it close to the fins 12 for effective cleaning. The innovative aspect of the present invention lies in the lowering hydraulic assembly and the power down hydraulic assembly. The hydraulic nozzle positioning system 150 is configured to "charge," the lowering hydraulic assembly meaning it fills the system with hydraulic fluid, pressurizes it, and ensures that it is ready to operate when needed. This charging process occurs concurrently while the lifting hydraulic assembly is in use. The precharging of the lowering hydraulic assembly ensures that it is always ready to be activated quickly. The power down hydraulic assembly is also configured to quickly pull the torpedo downward through greater hydraulic forces. When significant resistance is detected, indicating that nozzle housing 116 might be snagged or at risk of a destructive event, the operator can instantly employ the pressurized hydraulic fluid in the power down hydraulic assembly to more rapidly power down nozzle housing 116. This rapid downward movement helps to disengage nozzle housing 116 from any obstructions, thereby minimizing the risk of damage to nozzle housing 116 or boom 114.

The operation of hydraulic system 150 begins with the initial setup and charging, where hydraulic pump 152 delivers pressurized hydraulic fluid to tank 154. Hydraulic pump 152 and tank 154 may be any known in the art. Hydraulic pump 152 is configured to pressurize the hydraulic fluid to a pressure of approximately 2,750 PSI and tank 154 is configured to retain hydraulic fluid at said pressure.

The pressurized fluid is directed through suitable high pressure fluid lines into manifold 156. Manifold 156 includes a plurality of ports and valves to control the flow of hydraulic fluid to the system. One such port directs hydraulic fluid into control valve 158. Control valve 158 is configured to direct hydraulic fluid into the lifting and lowering hydraulic assemblies. In some embodiments, control valve 158 is a two-way shuttle valve with magnets configured to alter the location of an internal shuttle to open and close two outlet ports in the valve. However, control valve 158 may be any other type of valve known in the art that can control the flow of incoming hydraulic fluid through two or more ports.

The lifting hydraulic assembly includes fluid lines extending from control valve 158 to reducing valve 162 and fluid lines extending from reducing valve 162 to nozzle housing actuator 164. In some embodiments, reducing valve 162 is a valve configured to reduce the pressure of the hydraulic fluid from approximately 2,750 PSI to approximately 1,250 PSI. In some embodiments, the reducing valve 162 is configured to reduce the pressure of the hydraulic fluid from approximately 2,750 PSI to a pressure that overcomes the force of gravity plus the force of water jet 120 exiting nozzle 122. The hydraulic pressure is finely tuned to balance the weight of the nozzle housing 116 and the thrust of the water jet, allowing it to hover or float close to the fins 12 without exerting excessive force.

The lowering hydraulic assembly includes fluid lines extending from control valve 158 to reducing valve 166 and fluid lines extending from reducing valve 166 to nozzle housing actuator 164. In some embodiments, reducing valve 166 is a valve configured to reduce the pressure of the hydraulic fluid from approximately 2,750 PSI to approximately 250 PSI.

During use, tank 154 delivers pressurized hydraulic fluid to manifold 156. When the operator triggers controller 136 to lift nozzle housing 116, control valve 158 opens to allow pressurized fluid to fill the hydraulic lines between control valve 158 and both reducing valves 162 and 166. Reducing valve 166 remains closed but the hydraulic line between control valve 158 and reducing valve 166 is charged with pressurized hydraulic fluid. Unlike reducing valve 166, reducing valve 162 opens allowing hydraulic fluid at the reduced pressure to cause nozzle housing actuator 164 to lift/pivot nozzle housing 116 upwards towards fins 12.

The operator continuously monitors the force exerted on nozzle housing 116. If the operator detects resistance, the operator can use the controller to initiate a lowering action. In doing so, control valve 158 closes reducing valve 162

(and/or closes the outlet port to the lifting hydraulic assembly) and opens reducing valve 166. When reducing valve 166 opens, hydraulic fluid, at the reduced pressure, causes nozzle housing actuator 164 to drop/pivot nozzle housing 116 downwards away from fins 12. Because the lowering hydraulic assembly is pre-charged, the nozzle housing 116 is lowered more quickly in comparison to prior art devices, which reduces the risk of damage to the unit. Once the obstruction is cleared, the operator can re-initiate the lifting hydraulic assembly to resume the cleaning operation, with the hydraulic nozzle positioning system 150 automatically recharging the lowering hydraulic assembly to ensure it is ready for the next cycle.

If significant resistance is detected, indicating that nozzle housing 116 has encountered an obstruction such as hardened concrete, the operator can activate the power down function via the control interface on controller 136. This function causes power down valve 168 to open and direct the fully pressurized hydraulic fluid from tank 154 to nozzle housing actuator 164 to rapidly drop/pivot nozzle housing 116 downwards away from fins 12. The rapid lowering of nozzle housing 116 substantially reduces the risk of damage to the unit in comparison to prior art devices.

In some embodiments, the system continuously monitors the force exerted on nozzle housing 116 based on feel or pressure sensors integrated into the hydraulic lines, boom 114, nozzle housing 116, or any other part of the system. If significant resistance is detected, indicating that nozzle housing 116 has encountered an obstruction such as hardened concrete or a fin, the sensors trigger an alert to the operator. Upon receiving an alert, the operator can activate the lowering hydraulic assembly or the power down function via controller 136. Some embodiments are configured to automatically initiate a power down if the sensors detect significant resistance to further expedite the process of dropping nozzle housing 116 downward.

The improved hydraulic system 150 offers several advantages, including minimizing the risk of destructive events by reducing the likelihood of nozzle housing 116 or boom 114 being forced beyond their elastic limits, preventing costly and dangerous breakages. It also enhances operational efficiency by allowing for smoother and more continuous operation through the ability to quickly and effectively disengage nozzle housing 116 from obstructions. Additionally, the system improves safety by providing a rapid response mechanism to lower nozzle housing 116, protecting both the equipment and the operator.

Figure 13:
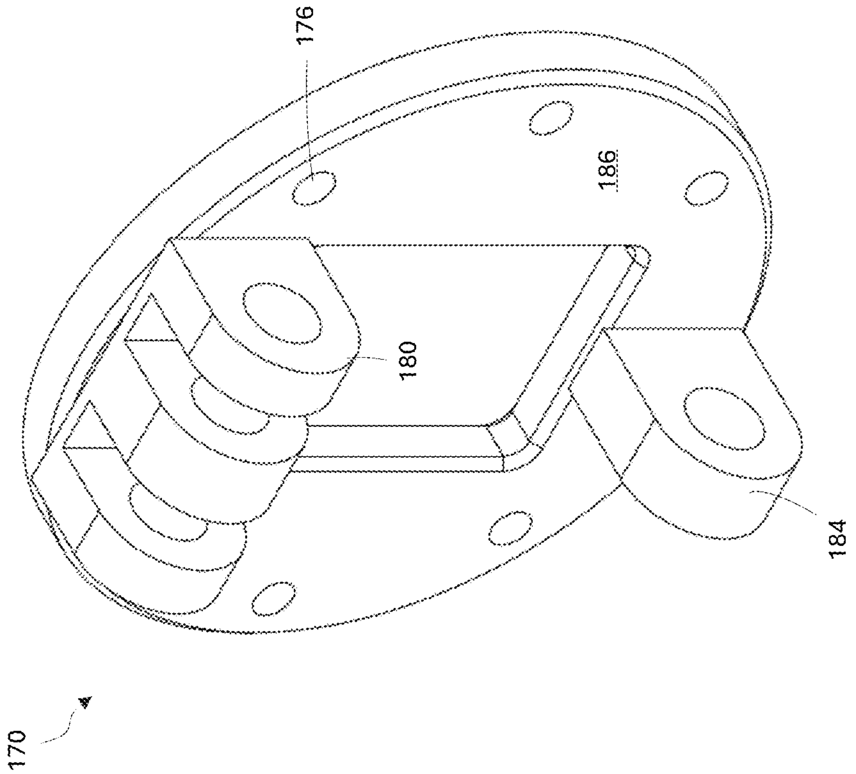
FIG. 13 is a perspective view of an embodiment of the breakaway hinge.

Referring now to FIG. 13, some embodiment of the present invention include breakaway hinge 170. Breakaway hinge 170 is configured to allow nozzle housing 116 to pivot relative to boom 114 and function as an intentional break point to enhance the safety and reliability of the system by limiting potential damage in critical situations.

To provide the pivoting connection, breakaway hinge 170 is configured to be connected to boom 114 through a series of fasteners (not shown) that pass through fastener apertures 176. Breakaway hinge 170 also includes a series of pin mounts 180 extending towards nozzle housing 116 in a spaced apart manner. The spaces are configured to accommodate similar pin mounts 182 extending from nozzle housing 116 (see FIG. 7). Pin 185 (see FIGS. 5 and 7) passes through the pin mounts allowing nozzle housing 116 to pivot about the longitudinal axis of the pin.

Breakaway hinge 170 also includes actuator mount 184, which is configured to receive a pin that engages similar mounts on nozzle housing actuator 164. When nozzle housing actuator 164 extends (see FIG. 5) nozzle housing 116 pivots about the longitudinal axis of the pin passing through pin mounts 180 and 182. In this manner, breakaway hinge enables precise positioning and movement necessary for effective cleaning of the concrete drum.

Breakaway hinge 170 also includes a breakaway mechanism, which serves as an intentional break point. This mechanism is engineered to disengage nozzle housing 116 from boom 114 when subjected to excessive force or torque beyond a predetermined threshold ("the breakaway threshold") and the operator or the system fails to disengage nozzle housing 116. The breakaway threshold is less than the force or torque required to plastically deform beam 114. The breakaway mechanism is calibrated to respond to situations where nozzle housing 116 encounters significant resistance, such as becoming stuck against hardened concrete or the internal fins of the drum, without permanently damaging beam 114 or other components on the unit.

In normal operation, the breakaway hinge allows the nozzle housing to pivot smoothly and adjust its position as directed by the operator. The hydraulic system moves the nozzle housing up and down, with breakaway hinge 170 facilitating these movements. However, if the operator does not act quickly enough to power down nozzle housing 116 in response to an obstruction, or if nozzle housing 116 becomes unexpectedly lodged, the breakaway mechanism allows nozzle housing 116 to detach from boom 114. This intentional separation is designed to prevent the transmission of damaging forces to the rest of the system, thereby protecting critical components. The detached nozzle housing can then be easily retrieved and reattached, minimizing downtime and repair costs.

In some embodiments, the breakaway mechanism is in the form a set of pre-stressed bolts or a similar fastener system that holds nozzle housing 116 to boom 114 under normal operating conditions. These bolts are designed to shear or disengage when the applied force exceeds the calibrated threshold. Additionally, or alternatively, mounts 180-184 and/or the corresponding pins may be configured to function as the breakaway mechanism by ensuring nozzle housing 116 remains securely attached during regular use but allowing for quick and controlled separation under excessive stress. In some embodiments, the breakaway mechanism is in the form welds that secure mounts 180-184 to surface 186. The welds are designed to break when the breakaway threshold is met.

This breakaway feature significantly enhances the system's resilience by providing a fail-safe mechanism to protect against unforeseen incidents. It ensures that any potential damage is localized to the nozzle housing, which can be more easily repaired or replaced, rather than affecting the entire system. This design consideration is crucial for maintaining the long-term durability and reliability of the concrete drum cleaning system, ensuring continuous and efficient operation with minimal interruptions.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An apparatus for removing residual concrete from an interior of a rotatably mounted ready mixed concrete truck drum, comprising:
   an elongated boom, wherein the boom is configured to be inserted into the drum generally along a longitudinal axis of the drum;
   a nozzle housing hingedly connected to a leading end of the boom so that the nozzle housing is positionable in a plurality of angular positions relative to the boom, wherein the nozzle housing includes:
      a high-pressure nozzle rotatably mounted within the nozzle housing;
      a motor configured to oscillate the nozzle about a stroke length;
      an encoder configured to monitor the position of the nozzle along the stroke length;
   a controller in operable communication with the motor and the encoder, wherein the controller is configured to dynamically alter the stroke length and includes an actuator to fix the nozzle at a location about the stroke length;
   a source of high-pressure water fluidically coupled to the nozzle;
   whereby the nozzle directs high-pressure water into residual concrete contained within the drum to clean the interior of the drum.

2. The system of claim 1, further including a user interface that displays the position of the nozzle about the stroke length.

3. The system of claim 1, further comprising actuators on the controller that allow the operator to alter the stroke length, oscillation speed, and fix the nozzle at a specific location along its stroke length.

4. The system of claim 1, wherein the controller is configured to limit the stroke length to any reduced range within the full stroke length.

5. The system of claim 1, further including:
   a boom translation sensor in operable communication with the controller;
   wherein the controller is configured to allow an operator to set a current position of the boom as a reference position by activating a boom zeroing actuator on the controller and the boom translation sensor is configured to track a change in position of the boom relative to the reference position and convey the change in position of the boom to the operator.

6. The system of claim 1, further including:
   a hydraulic system configured to pivot the nozzle housing relative to a longitudinal axis of the boom, the hydraulic system including a lifting hydraulic assembly, a lowering hydraulic assembly, and a power down hydraulic assembly;
   wherein the hydraulic system is configured to charge the lowering hydraulic assembly while the lifting hydraulic assembly is in use, enabling the lowering hydraulic assembly to quickly drop the nozzle housing;
   wherein the power down hydraulic assembly is configured to direct hydraulic fluid at greater pressure in comparison to the lowering hydraulic assembly to more rapidly drop the nozzle housing;
   wherein the controller is in operable communication with the hydraulic system to manage the hydraulic pressure and control the pivoting of the nozzle housing.

7. An apparatus for removing residual concrete from an interior of a rotatably mounted ready mixed concrete truck drum, comprising:
   an elongated boom, wherein the boom is configured to be inserted into the drum generally along a longitudinal axis of the drum;
   a nozzle housing hingedly connected to a leading end of the boom so that the nozzle housing is positionable in a plurality of angular positions relative to the boom, wherein the nozzle housing includes:
      a high-pressure nozzle rotatably mounted within the nozzle housing;
      a motor configured to oscillate the nozzle about a stroke length;
   a controller in operable communication with the boom, the controller including a boom zeroing actuator that is configured to a position of the boom as a zero point location wherein the controller is configured to display a distance that the boom travels relative to the zero point location;
   a boom translation sensor in communication with the controller, the boom translation sensor configured to track a change in position of the boom relative to the reference position and convey the change in position of the boom to the operator;
   a source of high-pressure water fluidically coupled to the nozzle;
   whereby the nozzle directs high-pressure water into residual concrete contained within the drum to clean the interior of the drum.

8. The system of claim 7, further including an encoder configured to monitor the position of the nozzle along the stroke length, wherein the controller is in operable communication with the motor and the encoder and is configured to dynamically alter the stroke length and stop rotation of the nozzle based on real-time feedback from the encoder.

9. The system of claim 8, further including a user interface that displays the position of the nozzle about the stroke length.

10. The system of claim 9, further comprising actuators on the controller that allow the operator to alter the stroke length, oscillation speed, and fix the nozzle at a specific location along its stroke length.

11. The system of claim 9, wherein the controller is configured to limit the stroke length to any reduced range within the full stroke length.

12. The system of claim 7, further including:
   a hydraulic system configured to pivot the nozzle housing relative to a longitudinal axis of the boom, the hydraulic system including a lifting hydraulic assembly, a lowering hydraulic assembly, and a power down hydraulic assembly;
   wherein the hydraulic system is configured to charge the lowering hydraulic assembly while the lifting hydraulic assembly is in use, enabling the lowering hydraulic assembly to quickly drop the nozzle housing;
   wherein the power down hydraulic assembly is configured to direct hydraulic fluid at greater pressure in comparison to the lowering hydraulic assembly to more rapidly drop the nozzle housing;
   wherein the controller is in operable communication with the hydraulic system to manage the hydraulic pressure and control the pivoting of the nozzle housing.

13. An apparatus for removing residual concrete from an interior of a rotatably mounted ready mixed concrete truck drum, comprising:
   an elongated boom, wherein the boom is configured to be inserted into the drum generally along a longitudinal axis of the drum;

a nozzle housing hingedly connected to a leading end of the boom so that the nozzle housing is positionable in a plurality of angular positions relative to the boom, wherein the nozzle housing includes:

a high-pressure nozzle rotatably mounted within the nozzle housing;

a motor configured to oscillate the nozzle about a stroke length;

a hydraulic system configured to pivot the nozzle housing relative to a longitudinal axis of the boom, the hydraulic system including a lifting hydraulic assembly, a lowering hydraulic assembly, and a power down hydraulic assembly;

wherein the hydraulic system is configured to charge the lowering hydraulic assembly while the lifting hydraulic assembly is in use, enabling the lowering hydraulic assembly to quickly drop the nozzle housing;

wherein the power down hydraulic assembly is configured to direct hydraulic fluid at greater pressure in comparison to the lowering hydraulic assembly to more rapidly drop the nozzle housing;

a controller in operable communication with the hydraulic system, the controller configured to manage the hydraulic pressure and control the pivoting of the nozzle housing;

a source of high-pressure water fluidically coupled to the nozzle;

whereby the nozzle directs high-pressure water into residual concrete contained within the drum to clean the interior of the drum.

14. The system of claim 13, further including an encoder configured to monitor the position of the nozzle along the stroke length, wherein the controller is in operable communication with the motor and the encoder and is configured to dynamically alter the stroke length and stop rotation of the nozzle based on real-time feedback from the encoder.

15. The system of claim 14, further including a user interface that displays the position of the nozzle about the stroke length.

16. The system of claim 15, further comprising actuators on the controller that allow the operator to alter the stroke length, oscillation speed, and fix the nozzle at a specific location along its stroke length.

17. The system of claim 15, wherein the controller is configured to limit the stroke length to any reduced range within the full stroke length.

18. The system of claim 13, further including:

a boom translation sensor in operable communication with the controller;

wherein the controller is configured to allow an operator to set a current position of the boom as a reference position by activating a boom zeroing actuator on the controller and the boom translation sensor is configured to track a change in position of the boom relative to the reference position and convey the change in position of the boom to the operator.

* * * * *